(12) United States Patent
Yuhara et al.

(10) Patent No.: US 11,041,085 B2
(45) Date of Patent: Jun. 22, 2021

(54) INK SET, IMAGE FORMING METHOD AND INK-JET RECORDING APPARATUS

(71) Applicant: Brother Kogyo Kabushiki Kaisha, Nagoya (JP)

(72) Inventors: Keisuke Yuhara, Nagoya (JP); Yasuhiro Taga, Kani (JP); Mitsunori Maeda, Nagoya (JP); Shinpei Ito, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 316 days.

(21) Appl. No.: 16/159,841

(22) Filed: Oct. 15, 2018

(65) Prior Publication Data

US 2019/0112493 A1    Apr. 18, 2019

(30) Foreign Application Priority Data

Oct. 16, 2017 (JP) .............................. JP2017-200322

(51) Int. Cl.
| | |
|---|---|
| *C09D 11/54* | (2014.01) |
| *C09D 11/322* | (2014.01) |
| *B41J 2/07* | (2006.01) |
| *B41M 5/00* | (2006.01) |
| *C09D 11/102* | (2014.01) |
| *B41J 2/21* | (2006.01) |
| *C09D 11/40* | (2014.01) |
| *B41J 3/407* | (2006.01) |

(Continued)

(52) U.S. Cl.
CPC ................ *C09D 11/54* (2013.01); *B41J 2/07* (2013.01); *B41J 2/2114* (2013.01); *B41J 3/4078* (2013.01); *B41J 11/0015* (2013.01); *B41M 5/0017* (2013.01); *C09D 11/102* (2013.01); *C09D 11/322* (2013.01); *C09D 11/40* (2013.01); *D06P 5/30* (2013.01)

(58) Field of Classification Search
None
See application file for complete search history.

(56) References Cited

U.S. PATENT DOCUMENTS

| | | |
|---|---|---|
| 5,609,671 A | 3/1997 | Nagasawa |
| 5,837,045 A | 11/1998 | Johnson et al. |

(Continued)

FOREIGN PATENT DOCUMENTS

| | | |
|---|---|---|
| JP | H08-003498 A | 1/1996 |
| JP | H08-039793 A | 2/1996 |

(Continued)

*Primary Examiner* — Helene Klemanski
(74) *Attorney, Agent, or Firm* — Banner & Witcoff, Ltd.

(57) ABSTRACT

There is provided an ink set usable for forming an image on a recording medium which is fabric or recording paper, the ink set including: a water-based ink for ink-jet recording including a pigment, a first resin and water; and a treatment agent including a second resin and the water. The ink set satisfies the following conditions (1) to (3): condition (1): $0.9 \leq (B+C)/A$; condition (2): $3 \leq A \leq 9$; condition (3): $B<9$. In the conditions (1) to (3), A: a blending amount (% by weight) of the pigment in an entire amount of the water-based ink; B: a blending amount (% by weight) of the first resin in the entire amount of the water-based ink; and C: a blending amount (% by weight) of the second resin in an entire amount of the treatment agent.

9 Claims, 4 Drawing Sheets

(51) Int. Cl.
  *B41J 11/00*   (2006.01)
  *D06P 5/30*   (2006.01)

(56) References Cited

U.S. PATENT DOCUMENTS

| | | | |
|---|---|---|---|
| 6,705,717 | B1 | 3/2004 | Fujita et al. |
| 8,016,404 | B2 | 9/2011 | Kato et al. |
| 9,206,325 | B2 * | 12/2015 | Fukaya ............... C09D 11/322 |
| 9,340,689 | B2 * | 5/2016 | Fukaya ................ C09D 11/14 |
| 9,393,808 | B2 * | 7/2016 | Ohishi ................ B41M 5/0017 |
| 9,440,455 | B2 | 9/2016 | Sayama et al. |
| 9,452,617 | B2 | 9/2016 | Sayama et al. |
| 9,555,647 | B2 | 1/2017 | Sayama et al. |
| 9,862,848 | B2 * | 1/2018 | Imai .................... C09D 11/102 |
| 10,493,775 | B2 * | 12/2019 | Ito .......................... B41J 3/4078 |
| 10,569,569 | B2 * | 2/2020 | Taga ................... D06P 1/5285 |
| 10,774,468 | B2 * | 9/2020 | Ito ........................... D06P 1/445 |
| 2003/0064206 | A1 * | 4/2003 | Koyano ............... B41M 5/0017 |
| | | | 428/195.1 |
| 2006/0201380 | A1 | 9/2006 | Kowalski et al. |
| 2007/0100023 | A1 | 5/2007 | Bums et al. |
| 2007/0100024 | A1 | 5/2007 | Gu et al. |
| 2008/0241398 | A1 | 10/2008 | Kato et al. |
| 2009/0229489 | A1 | 9/2009 | Gu |
| 2009/0258203 | A1 * | 10/2009 | Aoyama ............. B41J 2/17509 |
| | | | 428/207 |
| 2015/0174939 | A1 * | 6/2015 | Aoyama ............. B41M 5/0017 |
| | | | 347/21 |
| 2015/0251444 | A1 | 9/2015 | Sayama et al. |
| 2015/0251445 | A1 | 9/2015 | Sayama et al. |
| 2015/0251446 | A1 | 9/2015 | Sayama et al. |
| 2015/0251447 | A1 | 9/2015 | Sayama et al. |
| 2019/0003115 | A1 * | 1/2019 | Ohashi ..................... D06P 1/50 |
| 2019/0100871 | A1 * | 4/2019 | Taga ......................... D06P 1/66 |

FOREIGN PATENT DOCUMENTS

| | | |
|---|---|---|
| JP | 2000-513396 A | 10/2000 |
| JP | 2004-262081 A | 9/2004 |
| JP | 2008-524400 A | 7/2008 |
| JP | 2008-246821 A | 10/2008 |
| JP | 2009-515007 A | 4/2009 |
| JP | 2011-515535 A | 5/2011 |
| JP | 2015-168147 A | 9/2015 |
| JP | 2015-168148 A | 9/2015 |
| JP | 2015-168149 A | 9/2015 |
| JP | 2015-168901 A | 9/2015 |

\* cited by examiner

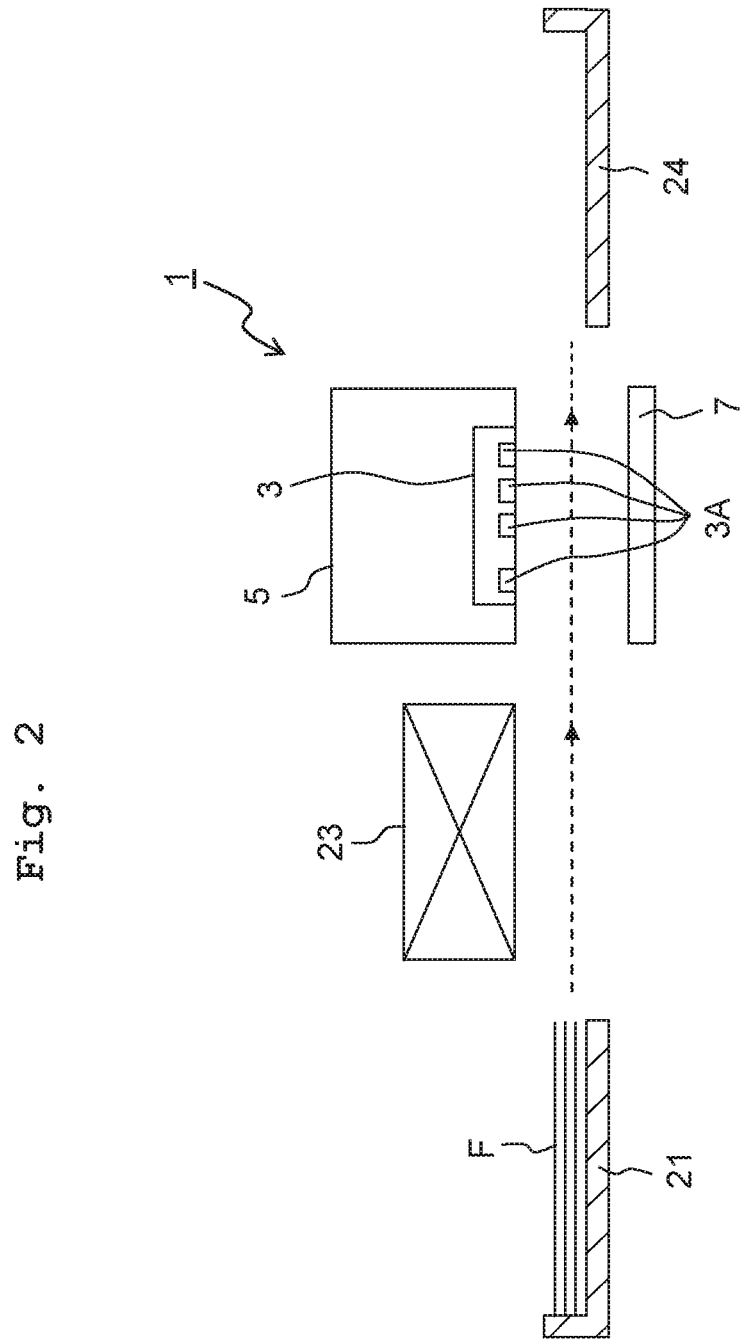

INK SET, IMAGE FORMING METHOD AND INK-JET RECORDING APPARATUS

CROSS REFERENCE TO RELATED APPLICATION

The present application claims priority from Japanese Patent Application No. 2017-200322 filed on Oct. 16, 2017 the disclosure of which is incorporated herein by reference in its entirety.

BACKGROUND

Field of the Invention

The present invention relates to an ink set, an image forming method and an ink-jet recording apparatus.

Description of the Related Art

There is suggested a variety of kinds of printing apparatus having a paper medium printing mode for performing printing with respect to a paper medium and a textile printing mode for performing printing with respect to a cloth medium (fabric medium) and capable of performing printing with respect to both of the paper medium and the cloth medium (see, for example, Japanese Patent Application Laid-open No. 2015-168147 corresponding to United States Patent Application Publication No. US2015/0251444).

However, in an image formation for forming an image on the fabric such as clothing, the fabric makes contact with the skin, unlike the paper medium; thus, the image formation on the fabric is required to have a high rubbing resistance (scratching resistance). The rubbing resistance can be improved by using a treatment agent, which includes a resin, together with a pigment ink in a combined manner to thereby enhance a fixing property of the pigment to the fabric. However, in a case that the amount of the resin is too much with respect to the amount of the pigment, the feel, by hand, of the fabric after the printing is hardened. Further, for example, a personal ink-jet recording apparatus for home or office use is provided with a maintenance mechanism which is configured to handle (process) a waste liquid, etc., and which is small as compared with that provided on an ink-jet recording apparatus for industrial use. Accordingly, an ink set provided on the personal ink-jet recording apparatus is required to have a high maintenance performance.

In view of the above situation, an object of the present teaching is to provide an ink set which is capable of realizing both of high rubbing resistance and suppressed change in feel by hand, which has a high maintenance performance, and which is applicable also to image formation on recording paper.

SUMMARY

According to a first aspect of the present teaching, there is provided an ink set usable for forming an image on a recording medium which is fabric or recording paper, the ink set including:

a water-based ink for ink-jet recording including a pigment, a first resin and water; and a treatment agent including a second resin and water, wherein the ink set satisfies the following conditions (1) to (3):

$0.9 \leq (B+C)/A$      condition (1):

$3 \leq A \leq 9$      condition (2):

$B < 9$,      condition (3):

in the conditions (1) to (3),

A: a blending amount (% by weight) of the pigment in an entire amount of the water-based ink, B: a blending amount (% by weight) of the first resin in the entire amount of the water-based ink, and C: a blending amount (% by weight) of the second resin in an entire amount of the treatment agent.

According to a second aspect of the present teaching, there is provided an image forming method for forming an image on a recording medium which is fabric or recording paper by using the ink set of the first aspect, in a case that the recording medium is the fabric, the image forming method including:

applying the treatment agent to the fabric in an application amount of the treatment agent per an area of the fabric in a range of 4.7 mg/cm$^2$ to 50 mg/cm$^2$; and jetting the water-based ink onto the fabric by an ink-jet system.

According to a third aspect of the present teaching, there is provided an ink jet-recording apparatus including:

an ink set accommodating section which accommodates therein the ink set of the first aspect;

an ink-jet head configured to jet the water-based ink composing the ink set onto a recording medium; and a treatment agent applying mechanism configured to apply the treatment agent composing the ink set to the recording medium; and a controller configured to control the treatment agent applying mechanism to apply the treatment agent to the recording medium, depending on a kind of the recording medium, and to control the ink-jet head to jet the water-based ink onto the recording medium.

BRIEF DESCRIPTION OF THE DRAWINGS

FIG. 2 is a schematic view of an example of the configuration of the ink-jet recording apparatus of the present teaching.

DESCRIPTION OF THE EMBODIMENTS

[Ink Set]

Figure 1:
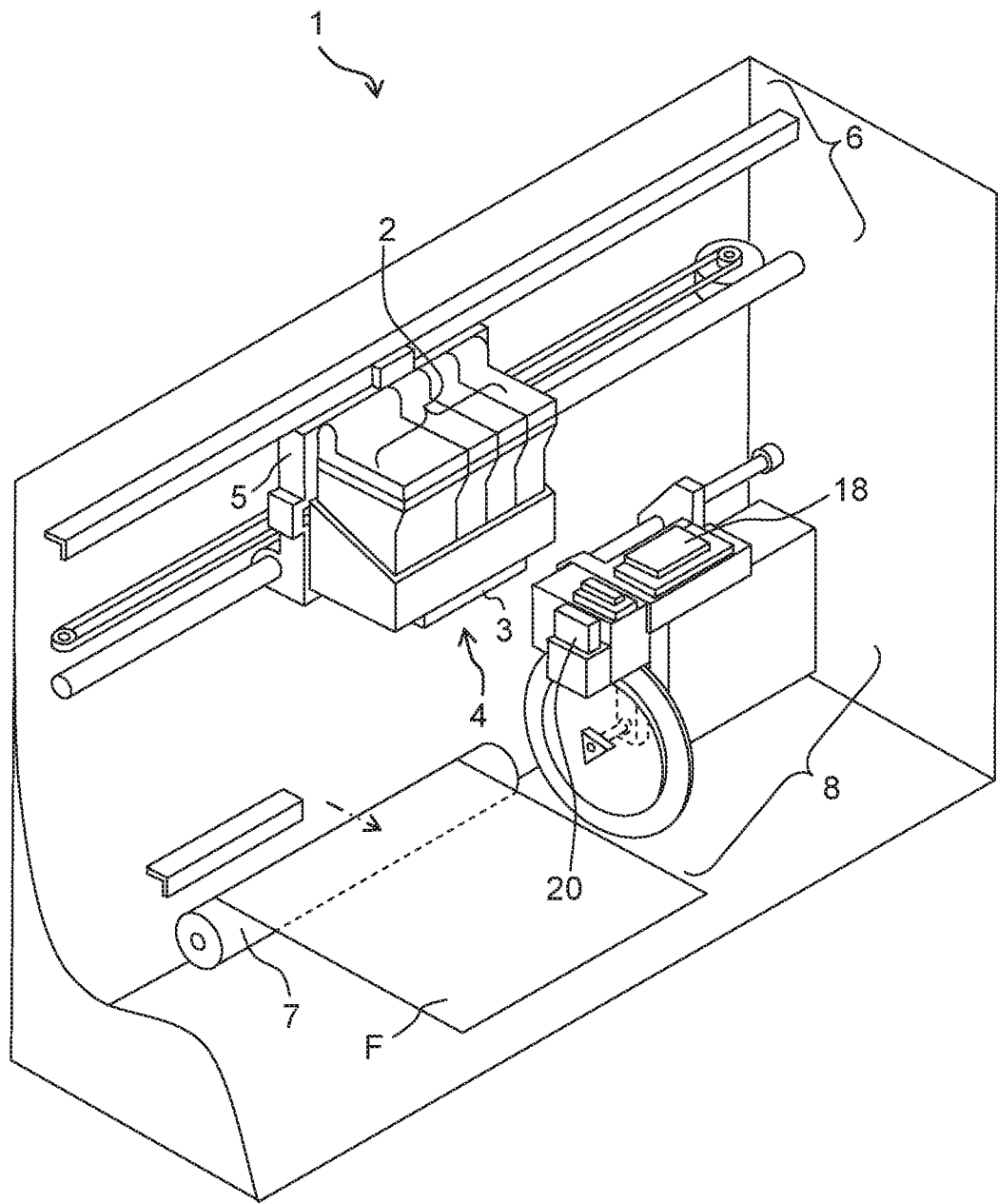
FIG. 1 is a schematic perspective view of an example of the configuration of an ink-jet recording apparatus of the present teaching.

An ink set of the present teaching will be explained. The ink set of the present teaching includes: a water-based ink for ink-jet recording (hereinafter rerefer to as "water-based ink" or "ink" in some cases); and a treatment agent. The ink set of the present teaching is usable for both of performing recording on a recording paper (recording paper sheet, recording sheet) and performing recording on a fabric.

<Water-Based Ink>

At first, the water-based ink will be explained. The water-based ink includes a pigment, a resin (first resin) and water.

The pigment is exemplified, for example, by a resin-dispersed pigment (resin-dispersible pigment, resin dispersion type pigment), self-dispersible pigment, etc.

The resin-dispersed pigment is dispersible in water by, for example, a resin for dispersing pigment (resin dispersant). A pigment usable as the resin-dispersed pigment is not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigments; nitroso pigments; aniline black daylight fluorescent pigment; and the like. Specific examples of these pigments are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violet 19, 196; C. I. Pigment Blues 1, 2, 3, 15, 15:1, 15:2, 15:3, 15:4, 16, 22, and 60; C. I. Pigment Greens 7 and 36; and the like. Further, the resin-dispersed pigment may be a solid solution of any one of the above-described pigments.

The pigment may be a self-dispersible pigment. The self-dispersible pigment is dispersible in water without using any dispersant, for example, owing to the fact that at least one of a hydrophilic functional group and the salt thereof including, for example, carbonyl group, hydroxyl group, carboxylic acid group, sulfonic acid group (sulfonate group), phosphoric acid group (phosphate group), etc., is introduced into the surfaces of the particles of the pigment by the chemical bond directly or with any group intervening therebetween. It is possible to use, as the self-dispersible pigments, a self-dispersible pigment wherein the pigment is subjected to a treatment by any one of methods described, for example, in Japanese Patent Application Laid-open No. HEIS-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. US 2006/0201380 A1, Published Japanese Translation of PCT International Publication for Patent Application No. 2009-515007 corresponding to United States Patent Application Publications No. US 2007/0100023 A1 and No. US 2007/0100024 A1, Published Japanese Translation of PCT International Publication for Patent Application No. 2011-515535 corresponding to United States Patent Application Publication No. US 2009/0229489 A1, etc. It is possible to use, as a material for the self-dispersible pigment, either one of the inorganic pigment and the organic pigment. Further, a pigment which is suitable for the above-described treatment includes, for example, carbon black such as "MA8", "MA100" and "#2650" produced by MITSUBISHI CHEMICAL CORPORATION, "Color Black FW200" produced by DEGUSSA-HULS AG, etc. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by CABOT CORPORATION; "BONJET (trade name) BLACK CW-2" and "BONJET (trade name) BLACK CW-3" produced by ORIENT CHEMICAL INDUSTRIES, LTD.; "LIOJET (trade name) WD BLACK 002C" produced by TOYO INK SC HOLDINGS CO., LTD.; and the like.

The average particle diameter (average particle size) of the pigment is, for example, not more than 110 nm. In a case that the average particle diameter of the pigment is not more than 110 nm, it is possible to obtain higher rubbing resistance. The average particle diameter can be calculated, for example, by performing measurement using a dynamic light scattering particle diameter distribution measuring apparatus "LB-550" manufactured by HORIBA, LTD., and with the intensity of scattered light as the reference for the particle diameter. A sample used for the measurement is, for example, a solution of the pigment, which is diluted such that the solid content amount is 0.02% by weight.

One kind of the pigment may be used singly, or two or more kinds of the pigment may be used in combination. The blending amount of the pigment in the entire amount of the water-based ink will be described later on.

It is allowable that the water-based ink includes a colorant different from the above-described pigment, for example, a dye or that the ink does not include a colorant different from the above-described pigment. However, in view of improving the water resistance of a printed matter, it is preferred that the ink includes, as the colorant, substantially only the pigment. The ratio of the pigment in the colorant is, for example, in a range of 90% by weight to 100% by weight, or in a range of 95% by weight to 100% by weight.

In a case that the pigment is the resin-dispersed pigment, the resin (first resin) included in the water-based ink may be, for example, a resin for dispersing pigment (resin dispersant), a resin for pigment fixation (binder resin) that helps the pigment fixation on a surface of a recording medium, a resin that functions as the resin dispersant and the binder resin, or both of the resin dispersant and the binder resin. In a case that the pigment is the self-dispersible pigment, the resin included in the water-based ink is, for example, the binder resin.

The resin dispersant is exemplified, for example, by that including at least one of methacrylic acid and acrylic acid as a monomer; it is allowable to use, as the resin dispersant, for example, a commercially available product. Examples of the commercially available product include "JOHNCRYL (trade name) 611", "JOHNCRYL (trade name) 586", "JOHNCRYL (trade name) 687", "JOHNCRYL (trade name) 63", and "JOHNCRYL (trade name) HPD296" produced by BASF CORPORATION (the former JOHNSON POLYMER L.L.C.); "Disperbyk (trade name) 190" and "Disperbyk (trade name) 191" produced by BYK ADDITIVES & INSTRUMENTS; and "SOLSPERSE (trade name) 20000" and "SOLSPERSE (trade name) 27000" produced by ZENECA.

The blending amount of the resin for dispersing pigment (resin dispersant) in the entire amount of the water-based ink is not particularly limited, and may be determined appropriately depending on, for example, the kind and the solid content amount of the pigment of the resin-dispersed pigment, etc. The ratio of the blending amount of the resin dispersant with respect to the blending amount of the resin-dispersed pigment in the water-based ink is, for example, in a range of 5% by weight to 100% by weight, or in a range of 10% by weight to 50% by weight.

The binder resin is exemplified, for example, by acrylic resin, styrene acrylic resin, urethane resin, polyvinyl alcohol resin, sodium polyacrylate, acrylic acid-maleic acid copolymer salt, styrene-maleic anhydride copolymer resin, vinyl acetate resin, vinyl acetate-acrylate copolymer resin, vinyl acetate-ethylene copolymer resin, etc. The binder resin may be prepared privately or independently in-house, or a commercially available product may be used for the binder resin. Examples of the commercially available product include "JOHNCRYL (trade name) JDX-6500" (styrene acrylic resin), "JOHNCRYL (trade name) 537" (acrylic resin), "JOHNCRYL (trade name) 60" (acrylic resin), "JOHNCRYL (trade name) 450" (styrene acrylic resin), "JOHNCRYL (trade name) 390" (acrylic resin), "JOHNCRYL (trade name) 62" (styrene acrylic resin), and "JOHNCRYL (trade name) HPD-96" (styrene acrylic resin), produced by BASF CORPORATION (the former JOHNSON POLYMER L.L.C.); "F-52" (acrylic resin), "KE-1148" (acrylic resin), and "PE-1304" (styrene acrylic resin) produced by SEIKO PMC CORPORATION; "SUPERFLEX (trade name) 210" (urethane resin) and "SUPERFLEX (trade name) E-4000" (urethane resin, active ingredient amount=45% by weight) produced by DAI-ICHI KOGYO SEIYAKU CO., LTD.; "UCOAT (trade name) UWS-145" (urethane resin), "PERMARIN (trade name) UA-150" (urethane resin), and "PERMARIN (trade name) UA-368" (urethane resin) produced by SANYO CHEMICAL INDUSTRIES, LTD.; "PVA-220" (10% aqueous solution of polyvinyl alcohol resin) and "PVA-203" (10% aqueous solution of polyvinyl alcohol resin) produced by KURARAY CO., LTD.; "AQUALIC (trade name) L DL-40" (sodium polyacrylate, active ingredient amount=40% by weight) and "AQUALIC (trade name) L TL-37" (acrylic acid-maleic acid copolymer salt, active ingredient amount=37% by weight) produced by NIPPON SHOKUBAI CO., LTD.; and the like. The above examples of the binder resin may be used also as the resin dispersant.

The resin included in the water-based ink may include a cationic polymer including a urethane structure which is similar to that which will be described later on as an example of the resin included in the treatment agent.

One kind of the resin included in the water-based ink may be used singly, or two or more kinds of the resin may be used in combination. The blending amount of the resin (first resin) in the entire amount of the water-based ink will be described later on.

The water included in the water-based ink is preferably ion-exchange water or purified water (pure water). The blending amount of the water with respect to the entire amount of the water-based ink is, for example, in a range of 10% by weight to 90% by weight, in a range of 40% by weight to 80% by weight, or in a range of 50% by weight to 80% by weight. The blending amount of the water with respect to the entire amount of the water-based ink may be, for example, a balance of the other components.

The water-based ink may further include a surfactant. The surfactant is not specifically limited, and is exemplified, for example, by anionic surfactants produced by LION SPECIALTY CHEMICALS CO., LTD., including "LIPOLAN (trade name)" series, "LIPON (trade name)" series, "SUNNOL (trade name)" series, "LIPOTAC (trade name) series, ENAGICOL (trade name)" series, "LIPAL (trade name)" series, and "LOTAT (trade name)" series, etc.; anionic surfactants produced by KAO CORPORATION including "EMAL (trade name)" series, "LATEMUL (trade name)" series, "VENOL (trade name)" series, "NEOPELEX (trade name)" series, NS SOAP, KS SOAP, OS SOAP, and "PELEX (trade name)" series, etc.; anionic surfactants produced by SANYO CHEMICAL INDUSTRIES, LTD., including "SANDET (trade name)" series and "BEAULIGHT (trade name)" series, etc.; anionic surfactants produced by TOHO CHEMICAL INDUSTRY CO., LTD., including "ALSCOPE (trade name)" series, "NEOSCOPE (trade name)" series, "PHOSFANOL (trade name)" series, etc.; anionic surfactants produced by TOKYO CHEMICAL INDUSTRY CO., LTD., including sodium hexadecyl sulfate, sodium stearyl sulfate, etc.; nonionic surfactants produced by LION SPECIALTY CHEMICALS CO., LTD., including "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, "LEOFAT (trade name)" series, etc.; nonionic surfactants produced by KAO CORPORATION, including "EMULGEN (trade name)" series, "RHEODOL (trade name)" series, "EMASOL (trade name)" series, "EXCEL (trade name)" series, "EMANON (trade name)" series, "AMIET (trade name)" series, "AMINON (trade name)" series, etc.; nonionic surfactants produced by NISSHIN CHEMICAL CO., LTD., including "OLFIN (trade name)" series, etc.; cationic surfactants produced by DAI-ICHI KOGYO SEIYAKU CO., LTD., including "CATIOGEN (trade name)", etc.; and the like. It is allowable that one kind of the surfactant is used singly, or two or more kinds of the surfactant are used in combination.

The blending amount of the surfactant with respect to the entire amount of the water-based ink is, for example, in a range of 0% by weight to 2% by weight, in a range of 0% by weight to 1% by weight, or in a range of 0% by weight to 0.5% by weight.

The water-based ink may further include a humectant which prevents the water-based ink from drying at an end of a nozzle in an ink-jet head.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone; ketoalcohols (ketone alcohols) such as diacetone alcohol, etc.; ethers such as tetrahydrofuran, dioxane, etc.; polyethers such as polyalkylene glycol, etc.; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that one kind of the humectant as described above is used singly, or two or more kinds of the humectant are used in combination. Among the above-described humectants, the humectant is preferably a polyvalent alcohol such as alkylene glycol, glycerol, etc.

The blending amount of the humectant with respect to the entire amount of the water-based ink is, for example, in a range of 0% by weight to 95% by weight, in a range of 5% by weight to 80% by weight, or in a range of 5% by weight to 50% by weight.

The water-based ink may further include a water-soluble organic solvent which is different from the humectant. The water-soluble organic solvent which is different from the humectant is exemplified, for example, by a penetrant which adjusts the drying velocity on a recording medium, etc.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The blending amount of the penetrant with respect to the entire amount of the water-based ink is, for example, in a range of 0% by weight to 20% by weight, in a range of 0% by weight to 15% by weight, or in a range of 1% by weight to 4% by weight.

The water-based ink may further include a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The water-based ink can be prepared, for example, by uniformly mixing the pigment, the resin and the water, and an optionally other additive(s) as necessary, by a conventionally known method, and then removing any non-dissolved matter, with a filter, etc.

<Treatment Agent>

Next, the treatment agent will be explained. The treatment agent includes a resin (second resin) and water.

The resin included in the treatment agent is exemplified by a cationic polymer, etc. The cationic polymer is exemplified, for example, by a cationic polymer including a urethane structure, polyamine, polyallylamine, polyethyleneimine, polyvinylamine, polyvinylpyridine, polyethyleneimine-epichlorohydrin reaction product, polyamide-polyamine resin, polyamide-epichlorohydrin resin, cationic starch, polyvinyl alcohol, polyvinylpyrrolidone, polyamidine, cationic epoxy resin, polyacrylamide, polyacrylic acid ester, polymethacrylic acid ester, polyvinyl formamide, aminoacetalized polyvinyl alcohol, polyvinyl benzyl onium, dicyandiamide-formalin polycondensate, dicyandiamide-diethylenetriamine polycondensate, epichlorohydrin-dimethylamine addition polymer, dimethyldiallylammonium chloride-$SO_2$ copolymer, dimethyldiallylammonium chloride polymer, derivatives thereof, etc. Further, the cationic polymer described above is also exemplified, for example, by a polymer of single monomer or a copolymer of a plurality of monomers composed of at least one of water-soluble monomers including, for example, dimethylaminoethyl methacrylate (DM), methacryloyloxyethyl trimethyl ammonium chloride (DMC), methacryloyloxyethyl benzyl dimethyl ammonium chloride (DMBC), dimethylaminoethyl acrylate (DA), acryloyloxyethyl trimethyl ammonium chloride (DMQ), acryloyloxyethyl benzyl dimethyl ammonium chloride (DABC), dimethylaminopropyl acrylamide (DMAPAA), acrylamide propyl trimethyl ammonium chloride (DMAPAAQ), etc. Among them, the cationic polymer having the urethane structure, polyallylamine, and polyethyleneimine are preferred. The cationic polymer having the urethane structure includes, for example, a cationic unit such as organic amine, together with the urethane structure. In a case that the cationic polymer is a cationic polymer included in an emulsion, the minimum film formation temperature (minimum film-forming temperature) of the cationic polymer is preferably not more than 25° C.

The cationic polymer having the urethane structure may be privately prepared in-house, or any commercially available product may be used as the cationic polymer having the urethane structure.

The cationic polymer having the urethane structure may be, for example, an emulsion (urethane emulsion). Namely, the treatment agent may contain an emulsion of the cationic polymer having the urethane structure (urethane emulsion).

The cationic polymer having the urethane structure preferably has at least one of an acrylic structure and a styrene structure, and more preferably has the acrylic structure, in a part, of the cationic polymer having the urethane structure, which is different from the urethane structure.

The cationic polymer having the urethane structure is, for example, an emulsion, and preferably has at least one of the acrylic structure and the styrene structure, and more preferably has the acrylic structure (is more preferably a urethane acrylic emulsion). A commercially available product of the urethane acrylic emulsion is exemplified, for example, by "MOWINYL (trade name) 6910" manufactured by JAPAN COATING RESIN CO., LTD.; "SUPERFLEX (trade name) 620", "SUPERFLEX (trade name) 650" manufactured by DKS CO., LTD (DAI-ICHI KOGYO SEIYAKU CO., LTD); and the like.

It is preferred that a ratio of the urethane structure (a ratio of occupation of the urethane structure) is not less than 10% by weight, more preferably not less than 20% by weight in the cationic polymer having the urethane structure. Note that in a case that the cationic polymer having the urethane structure is the urethane emulsion, the phrase "ratio of the urethane structure" means a ratio of the urethane structure in a solid content of the urethane emulsion.

A weight average molecular weight of the cationic polymer having the urethane structure is, for example, in a range of 1000 to 500000 or in a range of 3000 to 500000. Note that in a case that the cationic polymer having the urethane structure is the urethane emulsion, the phrase "weight average molecular weight" is the weight average molecular weight of the solid content of the urethane emulsion.

In the cationic polymer having the urethane structure described above, it is preferred that the urethane structure is obtained from aliphatic isocyanate and polyether-based polyol or polyester-based polyol.

The resin (second resin) included in the treatment agent may be a resin of a different kind from that of the resin (first resin) included in the water-based ink; or a part or all of the second resin may be of a same kind with that of the first resin.

The treatment agent may further include a surfactant, a water-soluble organic solvent and an additive which are similar to those exemplified in the water-based ink as described above.

It is preferred that the treatment agent does not substantially contain any colorant such as a dye and a pigment, etc., so as not to influence the color (hue) of the printed matter. The blending amount of the colorant in the entire amount of the treatment agent is, for example, in a range of 0% by weight to 1% by weight, or in a range of 0% by weight to 0.1% by weight. Further, the treatment agent may be an aqueous treatment agent (treatment agent-liquid) or a gel treatment agent. In a case that the treatment agent is the aqueous treatment agent (treatment agent-liquid) or the gel treatment agent, the treatment agent can be easily coated on (applied to) the recording medium.

The treatment agent can be prepared, for example, by uniformly mixing the resin and the water, and an optionally other additive(s) as necessary, by a conventionally known method.

In the ink set of the present teaching, the blending amount (A) (% by weight) of the pigment in the entire amount of the water-based ink, the blending amount (B) (% by weight) of the resin (first resin) in the entire amount of the water-based ink, and the blending amount (C) (% by weight) of the resin (second resin) in the entire amount of the treatment agent may be appropriately adjusted so as to satisfy the following conditions (1) to (3). Each of the blending amount (A) of the pigment, the blending amount (B) of the resin and the blending amount (C) of the resin is, for example, a solid content amount.

$$0.9 \leq (B+C)/A \qquad \text{condition (1):}$$

$$3 \leq A \leq 9 \qquad \text{condition (2):}$$

$$B < 9, \qquad \text{condition (3):}$$

In the ink set of the present teaching, the blending amount of the pigment in the water-based ink, the blending amount of the resin in the water-based ink and the blending amount of the resin in the treatment agent satisfy the predetermined conditions, thereby making it possible to realize, in the image formation on the fabric, both of the high rubbing resistance and suppressed change in feel by hand, to provide the high maintenance performance and the applicability also to image formation on recording paper. The fabric includes both of knit and textile. The material of the fabric may be either natural fiber or synthetic fiber. The natural fiber is exemplified, for example, by cotton, silk, etc. The synthetic fiber is exemplified, for example, by urethane, acrylic, polyester, nylon fibers, etc.

The value of (B+C)/A, the blending amount (A) of the pigment in the entire amount of the water-based ink, the blending amount (B) of the resin in the entire amount of the water-based ink and the blending amount (C) of the resin in the entire amount of the treatment agent are not particularly limited, provided that Conditions (1) to (3) are satisfied. For example, the value of (B+C)/A is preferably not more than 3. The blending amount (A) of the pigment in the entire amount of the water-based ink is preferably in a range of 3 to 8. The blending amount (B) of the resin in the entire amount of the water-based ink is, for example, greater than 0 (zero), is preferably not less than 1, and is more preferably in a range of 1 to 4.2. The blending amount (C) of the resin in the entire amount of the treatment agent is, for example, greater than 0 (zero), and is preferably in a range of 2 to 6.

In the ink set of the present teaching, it is preferred that the following condition (4) is further satisfied:

$$(B+C)/A \leq 2. \qquad \text{condition (4):}$$

In a case that the condition (4) is satisfied, it is possible, for example, to effectively suppress any hardening of the fabric after the image formation on the fabric. Note that although the value of (B+C)/A may exceed 2, the value of (B+C)/A preferably is not more than 3.

As described above, in the ink set of the present teaching, the blending amount (A) of the pigment in the water-based ink, the blending amount (B) of the resin (first resin) in the water-based ink and the blending amount (C) of the resin (second resin) in the treatment agent satisfy the predetermined conditions, thereby making it possible to realize, in the image formation on the fabric, both of the high rubbing resistance and suppressed change in feel by hand, to provide the high maintenance performance and the applicability also to image formation on recording paper.

[Image Forming Method and Ink-Jet Recording Apparatus]

Next, an image forming method of the present teaching will be explained.

The image forming method of the present teaching is an image forming method for forming an image on a recording medium which includes fabric and recording paper (recording medium which is fabric or recording paper) by using the ink set of the present teaching, the image forming method including an image printing step of printing an image on the recording medium by jetting the water-based ink onto the recording medium by an ink-jet system, in a case that the recording medium is the fabric, the method further including a treatment agent applying step of applying the treatment agent to the fabric, wherein in the treatment agent applying step, an application amount of the treatment agent per an area of the fabric is in a range of 4.7 mg/cm$^2$ (30 mg/inch$^2$) to 50 mg/cm$^2$ (320 mg/inch$^2$).

The ink set in the image forming method of the present teaching is similar to the above-described ink set of the present teaching; regarding the ink set in the image forming method of the present teaching, the explanation for the above-described ink set can be quoted herein by reference.

The image forming method of the present teaching can be carried out, for example, by using an ink-jet recording apparatus of the present teaching which is explained in the following.

The ink-jet recording apparatus of the present teaching is an ink-jet recording apparatus including: an ink set accommodating section; an ink jetting (discharging) mechanism; a treatment agent applying mechanism; and a controlling mechanism. The ink set of the present teaching is accommodated in the ink set accommodating section; the water-based ink composing the above-described ink set is jetted onto the recording medium by the ink jetting mechanism; the treatment agent composing the above-described ink set is applicable to the recording medium by the treatment agent applying mechanism; and the controlling mechanism is configured to control application of the treatment agent by the treatment agent applying mechanism, depending on a kind of the recording medium. Further, the controlling mechanism controls the ink jetting mechanism to also perform jetting of the water-based ink.

FIG. 1 depicts an example of the configuration of the ink-jet recording apparatus of the present teaching. As depicted in FIG. 1, an ink-jet recording apparatus (image forming apparatus) 1 includes, as main constitutive components, four ink cartridges (ink containers) 2, an ink jetting (discharging) mechanism (ink-jet head) 3, a head unit 4, a carriage 5, a driving unit 6, a platen roller 7, and a purge device 8. Although not depicted in FIG. 1, the ink-jet recording apparatus 1 further includes, at appropriate positions, the treatment agent applying mechanism and the controlling mechanism (controller), respectively. Further, although not depicted in FIG. 1, the ink-jet recording apparatus 1 may further include, at an appropriate position, a drying mechanism (which will be described later on).

Each of the four ink cartridges 2 contains one color ink of four water-based color inks which are yellow, magenta, cyan, and black inks. For example, at least one of the four color water-based inks is the water-based ink composing the ink set of the present teaching. In this exemplary embodiment, a set of the four ink cartridges 2 are depicted. However, in place of this four-ink cartridge set, it is also allowable to use an integrated type ink cartridge in which the interior thereof is comparted so that a water-based yellow ink accommodating section, a water-based magenta ink accommodating section, a water-based cyan ink accommodating section, and a water-based black ink accommodating section are formed. As a main body of the ink cartridge, for example, any conventionally known main body of an ink cartridge may be used.

The ink-jet head 3 disposed on the head unit 4 performs recording (image printing) on a recording medium (for example, fabric F). Note that the recording medium may be a recording medium other than (different from) the fabric F, such as recording paper (recording paper sheet, recording sheet), etc. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of recording (image printing), so as to prevent the water-based inks from drying.

In the ink-jet recording apparatus 1 of the present embodiment, the four ink cartridges (ink containers) 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 with tubes, etc., and the water-based inks are supplied from the four ink cartridges 2 via the tubes, respectively, to the head unit 4. Further, in these aspects, it is allowable to use four ink bottles having a bottle shape as the ink containers, instead of using the four ink cartridges 2. In such a case, each of the ink bottles is preferably provided with an inlet port via which the ink is poured from the outside to the inside of each of the ink bottles.

The image formation using the ink-jet recording apparatus 1 is performed, for example, in the following manner.

Figure 3A:
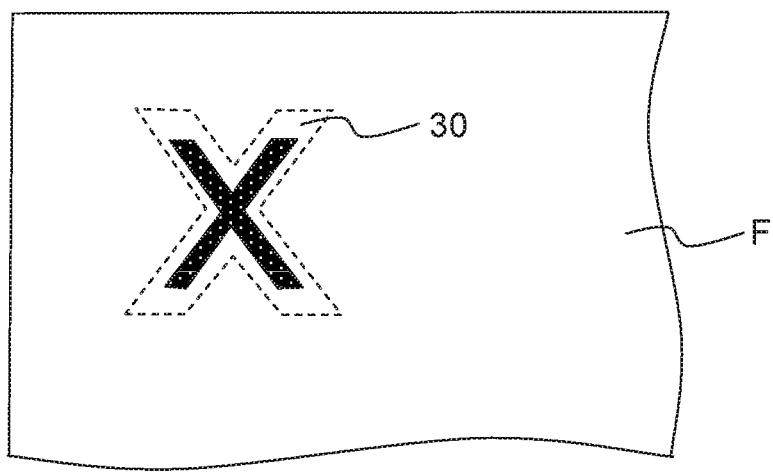
FIGS. 3A and 3B are each a view depicting an example of application of a treatment agent in an image forming method of the present teaching.
Figure 3B:
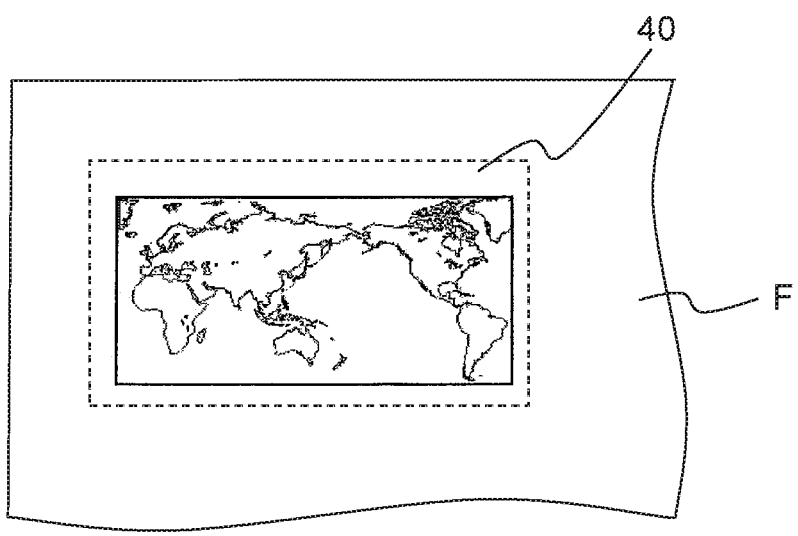

At first, the controlling mechanism controls the application of the treatment agent by the treatment agent applying mechanism, depending on the kind of the recording medium. Specifically, in a case that the recording medium is the fabric, the controlling mechanism selects the application of the treatment agent and makes an application amount, of the treatment agent, per an area of the fabric to be in a range of 4.7 mg/cm$^2$ to 50 mg/cm$^2$. On the other hand, in a case that the recording medium is a recording medium which is different from the fabric, such as recording paper, etc., the controlling mechanism causes, for example, a user to arbitrary select whether or not the treatment agent is to be applied. In a case that the user selects to apply the treatment agent to the recording paper, etc., the controlling mechanism controls the treatment agent applying mechanism so as to apply the treatment agent to the recording paper, etc. On the other hand, in a case that the user selects not to apply the treatment agent to the recording paper, etc., the controlling mechanism controls the treatment agent applying mechanism so as not to apply the treatment agent to the recording paper, etc. In the present teaching, the application of the treatment agent can be performed, for example, by means of a spray system, stamp application, brush application, roller application, dipping (immersion in the treatment agent), the ink-jet system, etc. The treatment agent may be applied to the entirety (entire surface) or a part of a recording surface (image formation surface) of the recording medium. In a case that the treatment agent is applied to the part of the recording surface, at least an image printing portion, of the recording surface of the recording medium, in which recording is (to be) performed by using the water-based ink is an application portion for the treatment agent. In a case that the treatment agent is applied to the part of the recording surface, the size of the application portion is preferably larger than the image printing portion. For example, as depicted in FIG. 3A, in a case that an image of a letter "X" is printed on a recording medium F, the treatment agent is preferably applied so that an application portion 30 is formed to have a line width which is larger than a line width of the letter. Further, as depicted in FIG. 3B, in a case that an image of a pattern is printed on the recording medium F, the treatment agent is preferably applied so that an application portion 40 is formed to be larger than the pattern.

In a case that the recording medium is the fabric, the image forming method of the present teaching may further include a drying step of drying the treatment agent applied in the treatment agent applying step. By performing the drying step, it is possible to suppress any bleeding in the printed matter. The drying step may be performed before an image printing step (to be described later on), or may be performed after the image printing step. Note that in the image forming method of the present teaching, whether or not to perform the drying step is arbitrary; it is allowable that the drying step is not performed even in a case that the recording medium is the fabric.

The drying may be, for example, air drying (natural drying). Alternatively, the drying may be performed by using any commercially available drying mechanism such as an iron, a hot press machine, a dryer, an oven, a belt conveyer oven, etc. The drying temperature at a time of performing the drying is, for example, in a range of 130° C. to 220° C., and the drying time (duration) is, for example, in a range of 30 seconds to 120 seconds. The drying temperature may be, for example, either a temperature of the drying atmosphere or a setting temperature of the drying mechanism.

As depicted in FIG. 2, the drying step may be performed by using a drying mechanism 23 provided on the ink-jet recording apparatus 1, as depicted in FIG. 1, of the present teaching. Parts or portion in FIG. 2 which are the same as those depicted in FIG. 1 are assigned with the same reference numerals. Note that in FIG. 2, reference numerals 21 and 24 indicate a supply tray and a discharge tray, respectively, of which illustration are omitted in FIG. 1; a reference numeral 3A indicates a plurality of nozzles formed in the lower surface of the ink-jet head 3. Further, the drying step may be performed at the outside of the ink-jet recording apparatus.

In the drying step, it is allowable, for example, that the weight of the applied treatment agent is reduced to be not more than 50% of the application amount at a time at which the treatment agent has been applied (application time), or that the weight of the applied treatment agent is reduced to be not more than 30% of the application amount, of the treatment agent, at the application time. The drying step may be expressed also as a solvent-volatilizing step of volatilizing a solvent in the treatment agent (for example, the water, the water-soluble organic solvent, etc.) and/or a weight-reducing step of reducing the weight of the treatment agent. It is allowable that the controlling mechanism (controller, not depicted in the drawings) controls the drying mechanism 23 so as to reduce the weight of the applied treatment agent to be not more than 50% of the application amount, of the treatment agent, at the application time. For example, the controlling mechanism (controller, not depicted in the drawings) may control the setting temperature (the drying temperature) and/or an operating time (the drying time) of the drying mechanism 23.

Next, the water-based ink is jetted from the ink-jet head 3 onto the recording medium to thereby print an image on the recording medium. In this situation, in a case that a selection is made to apply the treatment agent in the treatment agent applying step, the water-based ink is jetted onto an application portion, in the recording medium, for the treatment agent.

In this embodiment, in a case that the selection is made to apply the treatment agent, the treatment agent is used as a pre-treatment agent which is to be applied to the recording medium before performing jetting of the water-based ink. However, the present teaching is not limited to or restricted by this. In the present teaching, it is allowable that the water-based ink is jetted firstly onto the recording medium, and then the treatment agent is applied to the recording medium; alternatively, it is allowable that the application of the treatment agent and the jetting of the water-based ink are performed at the same time.

The recording medium having the image formed thereon in such a manner is discharged from the ink-jet recording apparatus 1. According to the present teaching, it is possible to realize both of the high rubbing resistance and suppressed change in feel by hand, to realize the high maintenance performance, as well as the applicability also to image formation on recording paper. Note that in FIG. 1, the supply and discharge mechanisms for the recording medium F are omitted in the illustration of FIG. 1.

The apparatus depicted in FIG. 1 adopts the serial type ink-jet head. However, the present teaching is not limited to or restricted by this. The ink-jet recording apparatus may be an apparatus which adopts a line type ink-jet head.

In a case that the recording medium is the fabric, the image forming method of the present teaching may further include a washing step of washing the fabric with water. The washing step may be performed after the image printing step. By performing the washing step, it is possible to improve the water resistance of the printed matter.

Figure 4:
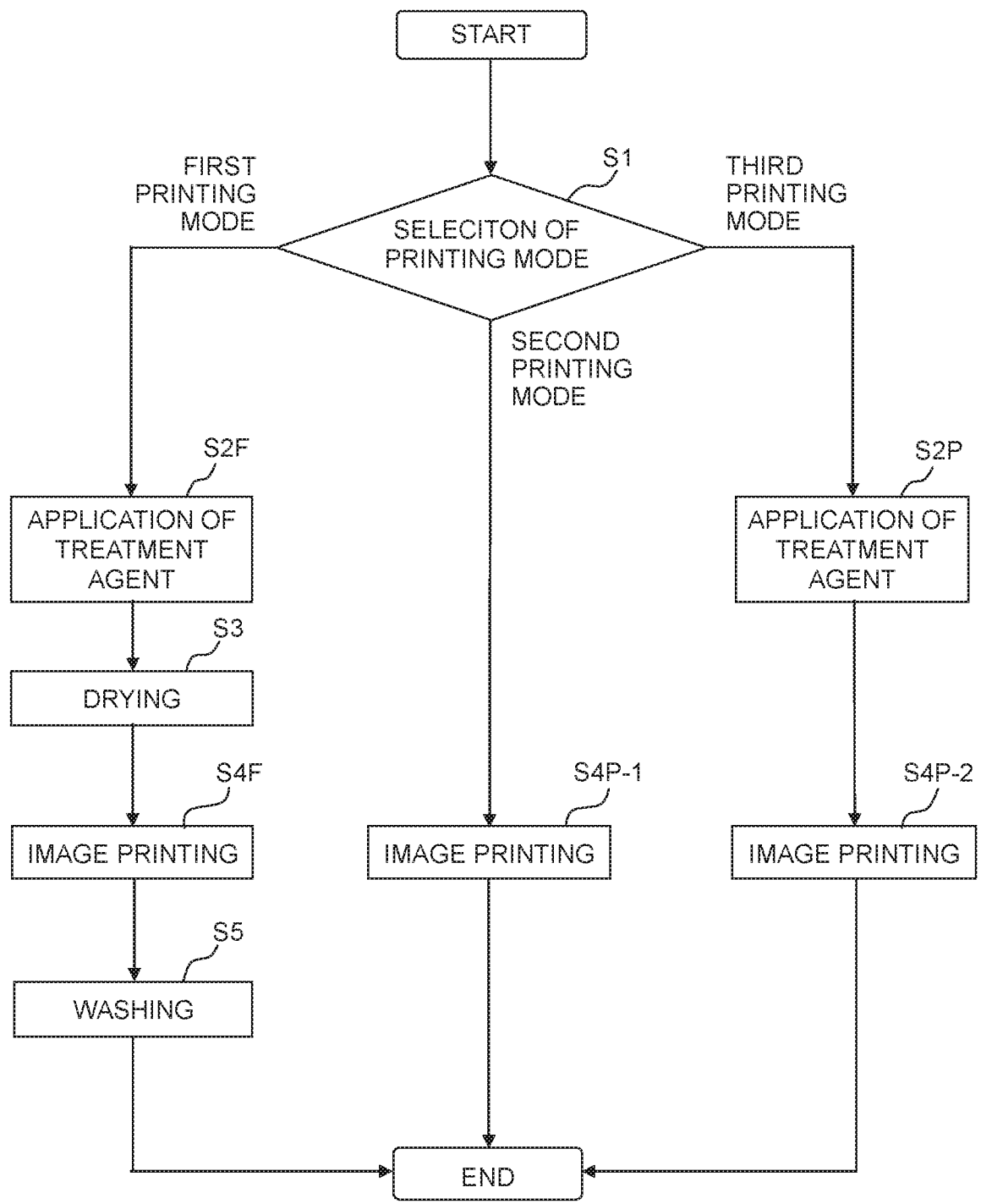
FIG. 4 is a flow chart indicating an example of an image forming method of the present teaching.

Next, an explanation will be given about an example of the image forming method of the present teaching, in accordance with a flowchart indicated in FIG. 4. Note that the image forming method which will be explained below is merely an example, and the present teaching is not limited to or restricted by this example. Firstly, depending on the kind of the recording medium (fabric or recording paper), selection of printing mode is performed (step S1 of FIG. 4). In a case that the recording medium is the fabric, the controller of the image forming apparatus selects a "first printing mode (fabric printing mode)"; on the other hand, in a case that the recording medium is the recording paper, the controller of the image forming apparatus selects a "second printing mode (recording paper printing mode 1)" or a "third printing mode (recording paper printing mode 2)". For example, the controller of the image forming apparatus may determine as to which one among the "first printing mode", the "second printing mode" and the "third printing mode" is to be performed, in accordance with (based on) a signal inputted from a user interface. Alternatively, the controller may determine as to which one among the "first printing mode", the "second printing mode" and the "third printing mode" is to be performed, in accordance with (based on) a flag corresponding to the mode selected on the user interface.

In a case that the first printing mode (fabric printing mode) is selected, the treatment agent applying step (step S2F of FIG. 4), the drying step (step S3 of FIG. 4) and the image printing step (step S4F of FIG. 4) are performed in this order. It is allowable to further perform the washing step (step S5 of FIG. 4) after the image printing step (step S4F of FIG. 4). On the other hand, in a case that the second printing mode (recording paper printing mode 1) is selected, the image printing step (step S4P-1 in FIG. 4) is performed, without performing the above-described treatment agent applying step and drying step. In a case that the third printing mode (recording paper printing mode 2) is selected, the treatment agent applying step (step S2P of FIG. 4) and the image printing step (step S4P-2 of FIG. 4) are performed in this order.

The image forming method of the present teaching as described above may be performed by using an ink-jet recording apparatus provided with the treatment agent applying mechanism and/or the drying mechanism, or may be performed by using an ink-jet recording apparatus which is not provided with the treatment-agent applying mechanism and/or the drying mechanism. In a case that the image forming method is performed by using the ink-jet recording apparatus which is not provided with the treatment-agent applying mechanism and/or the drying mechanism, it is allowable, for example, that a user applies the treatment agent to the fabric and the recording paper by the spraying method, and/or that the user may dry the treatment agent applied to the fabric with an iron or a dryer.

EXAMPLES

Next, Examples of the present teaching are explained together with Comparative Examples. Note that the present teaching is not limited to or restricted by Examples and Comparative Examples described below.

*4: Surfactant produced by NISSAN CHEMICAL INDUSTRIES, LTD.; numerical values in TABLE 1 indicate active ingredient amounts

*5: Surfactant produced by LION SPECIALTY CHEMICALS CO., LTD.; numerical values in TABLE 1 indicate active ingredient amounts The blending amounts of the pigment, the resin dispersant and the resin indicate the solid content amounts, respectively.

TABLE 1

| | | WATER-BASED CYAN INKS | | | | | | | |
|---|---|---|---|---|---|---|---|---|---|
| | | C1 | C2 | C3 | C4 | C5 | C6 | C7 | C8 |
| Ink Composition (% by weight) | CAB-O-JET (trade name) 250 C (A) (*1) | 3 | 4 | 5 | 5 | 8 | 7 | 9 | 5 |
| | Aqueous dispersion Pigment (A) of pigment (*2) Resin dispersant (B) | — | — | — | — | — | — | — | — |
| | JOHNCRYL (trade name) JDX-6500 (B) (*3) | 2 | 1 | 1 | 3 | 1 | 2 | 4.5 | 9 |
| | Glycerol | 12 | 12 | 12 | 12 | 12 | 12 | 12 | 12 |
| | Triethylene glycol n-butyl ether | 4 | 4 | 4 | 4 | 4 | 4 | 4 | 4 |
| | OLFIN (trade name) E1010 (*4) | 0.2 | 0.2 | 0.2 | 0.2 | 0.2 | 0.2 | 0.2 | 0.2 |
| | SUNNOL (trade name) NL 1430 (*5) | 0.2 | 0.2 | 0. | 0.2 | 0.2 | 0.2 | 0.2 | 0.2 |
| | Water | balance | balance | balance | balance | balance | balance | balance | balance |

| | | WATER-BASED CYAN INKS | | | | |
|---|---|---|---|---|---|---|
| | | C9 | C10 | C11 | C12 | C13 |
| Ink Composition (% by weight) | CAB-O-JET (trade name) 250C (A) (*1) | — | — | — | — | — |
| | Aqueous dispersion Pigment (A) | 3.5 | 6.5 | 4.5 | 8 | 5 |
| | of pigment (*2) Resin dispersant (B) | 1.4 | 2.6 | 1.8 | 3.2 | 2 |
| | JOHNCRYL (trade name) JDX-6500 (B) (*3) | 2 | 1 | 1 | 1 | — |
| | Glycerol | 12 | 12 | 12 | 12 | 12 |
| | Triethylene glycol n-butyl ether | 4 | 4 | 4 | 4 | 4 |
| | OLFIN (trade name) E1010 (*4) | 0.2 | 0.2 | 0.2 | 0.2 | 0.2 |
| | SUNNOL (trade name) NL 1430 (*5) | 0.2 | 0.2 | 0.2 | 0.2 | 0.2 |
| | Water | balance | balance | balance | balance | balance |

[Preparation of Water-Based Ink]

Respective components of Water-based Ink Composition (TABLE 1), which were different from CAB-O-JET (trade name) 250 or a water (aqueous) pigment dispersion, were mixed uniformly or homogeneously; and thus an ink solvent was obtained. Subsequently, the ink solvent was added to each of CAB-O-JET (trade name) 200 dispersed in water or the water (aqueous) pigment dispersion, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus each of water-based cyan inks C1 to C13 indicated in TABLE 1 was obtained. Note that the water (aqueous) pigment dispersion was prepared by dispersing a pigment (C.I. Pigment Blue 15:3) in water by a conventionally known method with the resin dispersant.

Table 1 (Following)—Legend

*1: Self-dispersible cyan pigment (average particle diameter: 103 nm); produced by CABOT CORPORATION

*2: Aqueous dispersion of C. I. Pigment Blue 15:3 (average particle diameter: 110 nm) containing resin dispersant of which content amount corresponds to 40% by weight of the pigment solid content amount)

*3: Styrene acrylic resin produced by BASF CORPORATION (the former JOHNSON POLYMER L.L.C.)

[Preparation of Treatment Agent]

Respective components of Treatment Agent Composition (TABLE 2) were mixed uniformly or homogeneously; and thus eleven (11) kinds of treatment agents 1 to 11 were obtained.

Table 2 (Following)—Legend

*6: Cationic urethane acrylic emulsion; produced by JAPAN COATING RESIN CORPORATION; numerical values in TABLE 2 indicate solid content amounts.

*7: Cationic polyallylamine, produced by NITTOBO MEDICAL CO., LTD.; numerical values in TABLE 2 indicate solid content amount.

4: Surfactant produced by LION SPECIALTY CHEMICALS CO., LTD.; numerical values in TABLE 2 indicate active ingredient amounts.

The unit of the treatment agent composition is % by weight.

TABLE 2

| | | | colspan="11" | TREATMENT AGENTS |
|---|---|---|---|---|---|---|---|---|---|---|---|---|
| | | | 1 | 2 | 3 | 4 | 5 | 6 | 7 | 8 | 9 | 10 | 11 |
| Treating Agent Composition (% by weight) | Resin (C) | MOWINYL (trade name) 6910 (*6) | — | 0.5 | 1 | 2 | 3 | 3.5 | 4 | 5 | 5.5 | 6 | — |
| | | PAA (trade name)-01 (*7) | — | — | — | — | — | — | — | — | — | — | 2 |
| | | Propylene glycerol | 40 | 40 | 40 | 40 | 40 | 40 | 40 | 40 | 40 | 40 | 40 |
| | | OLFIN (trade name) E1010 (*4) | 0.9 | 0.9 | 0.9 | 0.9 | 0.9 | 0.9 | 0.9 | 0.9 | 0.9 | 0.9 | 0.9 |
| | | Water | balance | balance | balance | balance | balance | balance | balance | balance | balance | balance | balance |

Examples 1 to 11 and Comparative Examples 1 to 5

[Configuration of Ink Set]

By combining the water-based cyan inks indicated in TABLE 1 with the treatment agents indicted in TABLE 2, ink sets of Examples 1 to 11 and Comparative Examples 1 to 5 were obtained, as indicated in TABLE 3.

[Evaluation of Ink Set]

With respect to each of the ink sets of Examples 1 to 11 and Comparative Examples 1 to 5, (a) Evaluation of the rubbing resistance in fabric, (b) Evaluation of the rubbing resistance in recording paper, (c) Evaluation of the maintenance performance of the ink, and (d) Evaluation of feel by hand in fabric were performed by the following methods, respectively.

(a) Evaluation of Rubbing Resistance in Fabric

The treatment agent was applied to an image-formation portion of a recording surface (image formation surface) of a fabric (cotton having A4 size (297 mm×210 mm)) by using a spray. In this procedure, the application amount of the treatment agent was approximately 2.5 g with respect to the entirety of the fabric. Subsequently, the fabric was dried under a condition of 160° C. for 60 seconds by using an iron. Next, 0.1 g of the water-based cyan ink was coated on the image formation portion in the recording surface (image formation surface) of the fabric by using a spray, and then the fabric was dried by using a drier. Thus, an evaluation sample was produced. The image formation portion of the evaluation sample was rubbed with a cotton swab; an amount of the ink adhered to the cotton swab when the image formation portion of the evaluation sample was rubbed by the cotton swab was visually observed, and the evaluation was performed therefor in accordance with the following criterion for evaluation.

<Criterion for Evaluation of Rubbing Resistance in Fabric>

A: It was observed that the water-based ink adhered to an area, of the rubbed surface portion of the cotton swab, which was approximately less than 20% of the rubbed surface portion.

B: It was observed that the water-based ink adhered to an area, of the rubbed surface portion of the cotton swab, which was approximately in a range of 20% to 50% of the rubbed surface portion.

C: It was observed that the water-based ink adhered to an area, of the rubbed surface portion of the cotton swab, which was approximately more than 50% of the rubbed surface portion.

(b) Evaluation of Rubbing Resistance in Recording Paper

The water-based cyan ink was coated on a portion of copying paper ("MULTI PAPER SUPER WHITE+" manufactured by ASKUL CORPORATION) by using a bar coater (Bar Coater, Rod No. 3 produced by YASUDA SEIKI SEISAKUSHO, LTD.). Thus, an evaluation sample was prepared. After sufficiently drying the evaluation sample, the portion having the ink coated thereon of the evaluation sample was rubbed with a cotton swab; an amount of the ink adhered to the cotton swab when the portion, of the evaluation sample, having the ink coated thereon was rubbed by the cotton swab was visually observed, and the evaluation was performed therefor in accordance with the following criterion for evaluation.

<Criterion for Evaluation of Rubbing Resistance in Recording Paper>

A: It was observed that the water-based ink did not adhere to the rubbed surface portion of the cotton swab, or it was observed that the water-based ink adhered to an area, of the rubbed surface portion of the cotton swab, which was approximately less than 10% of the rubbed surface portion.

B: It was observed that the water-based ink adhered to an area, of the rubbed surface portion of the cotton swab, which was approximately in a range of 10% to less than 30% of the rubbed surface portion.

C: It was observed that the water-based ink adhered to an area, of the rubbed surface portion of the cotton swab, which was approximately not less than 30% of the rubbed surface portion.

(c) Evaluation of Maintenance Performance of Ink

The water-based cyan ink was filled in an ink flow channel of an ink-jet printer-equipped digital multifunction machine DCP-J4225N produced by BROTHER INDUSTRIES, LTD., and the digital multifunction machine DCP-J4225N was left to stand for two days. After that, a pattern for checking occurrence of white void having pinhole shape was printed by using the ink-jet printer-equipped digital multifunction machine DCP-J4225N, and it was confirmed whether or not there was any occurrence of white void having the pinhole shape. Further, the purge was performed twice. Then, the pattern for checking occurrence of white void having pinhole shape was printed again by using the ink-jet printer-equipped digital multifunction machine DCP-J4225N, and it was confirmed whether or not there was any occurrence of white void having the pinhole shape, and evaluation was performed therefor in accordance with the following criterion for evaluation.

<Evaluation Criterion for Evaluation of Maintenance Performance of Ink>

G: No white void having pinhole shape occurred after leaving the printer for two days, or the occurrence of white void having the pinhole shape was solved by the purge performed twice.

NG: The occurrence of white void having the pinhole shape was not solved even after the purge performed twice.

(d) Evaluation of Feel by Hand in Fabric

The evaluation sample in (a) Evaluation of the rubbing resistance in fabric and the original fabric for which the application of the treatment agent and the coating of the water-based cyan ink were not performed were touched by hand; it was confirmed whether or not the feel by touch became hardened in the evaluation sample, as compared with the original fabric, and evaluation was performed therefor in accordance with the following criterion for evaluation.

<Evaluation Criterion for Evaluation of Feel by Hand in Fabric>

A: There was no change in feel by hand (hardness).

B: The feel by hand was hardened to some extent, but at a level causing no problems in practical use.

C: The feel by hand was clearly hardened.

TABLE 3 indicates the configuration of the ink set of each of Examples 1 to 11 and Comparative Examples 1 to 5, and the evaluation results for each of the ink sets of Examples 1 to 11 and Comparative Examples 1 to 5.

TABLE 3

| | EXAMPLES | | | | | | | |
|---|---|---|---|---|---|---|---|---|
| | 1 | 2 | 3 | 4 | 5 | 6 | 7 | 8 |
| Water-based cyan ink | C1 | C1 | C2 | C3 | C4 | C5 | C6 | C9 |
| A (% by weight) | 3 | 3 | 4 | 5 | 5 | 8 | 7 | 3.5 |
| B (% by weight) | 2 | 2 | 1 | 1 | 3 | 1 | 2 | 3.4 |
| Treatment Agent | 4 | 8 | 6 | 8 | 11 | 10 | 8 | 5 |
| C (% by weight) | 2 | 5 | 3.5 | 5 | 2 | 6 | 5 | 3 |
| (B + C)/A | 1.3 | 2.3 | 1.1 | 1.2 | 1.0 | 0.9 | 1.0 | 1.8 |
| Evaluation of the rubbing resistance in fabric | A | A | A | A | B | A | A | A |
| Evaluation of the rubbing resistance in recording paper | A | A | A | A | A | A | A | A |
| Evaluation of the maintenance performance of the ink | G | G | G | G | G | G | G | G |
| Evaluation of feel by hand in fabric | A | B | A | A | A | A | A | A |

| | EXAMPLES | | | COMPARATIVE EXAMPLES | | | | |
|---|---|---|---|---|---|---|---|---|
| | 9 | 10 | 11 | 1 | 2 | 3 | 4 | 5 |
| Water-based cyan ink | C10 | C11 | C12 | C1 | C1 | C13 | C7 | C8 |
| A (% by weight) | 6.5 | 4.5 | 8 | 3 | 3 | 5 | 9 | 5 |
| B (% by weight) | 3.6 | 2.8 | 4.2 | 2 | 2 | 2 | 4.5 | 9 |
| Treatment Agent | 9 | 7 | 10 | 1 | 2 | 3 | 5 | 3 |
| C (% by weight) | 5.5 | 4 | 6 | 0 | 0.5 | 1 | 3 | 1 |
| (B + C)/A | 1.4 | 1.5 | 1.3 | 0.7 | 0.8 | 0.6 | 0.8 | 2.0 |
| Evaluation of the rubbing resistance in fabric | A | A | A | C | C | C | C | A |
| Evaluation of the rubbing resistance in recording paper | A | A | A | A | A | A | A | A |
| Evaluation of the maintenance performance of the ink | G | G | G | G | G | G | G | NG |
| Evaluation of feel by hand in fabric | A | A | A | A | A | A | A | A |

As indicated in TABLE 3, Examples 1 to 11 each had all satisfactory results in the evaluation of the rubbing resistance in fabric, the evaluation of the rubbing resistance in recording paper, the evaluation of the maintenance performance of the ink, and the evaluation of feel by hand in fabric.

Each of Examples 1 to 4 and 6 to 11 in which the resin included in the treatment agent was the cationic urethane acrylic emulsion had further satisfactory result in the evaluation of the rubbing resistance in fabric, as compared with that in Example 5 in which the resin was the cationic polyallylamine.

Each of Examples 1 and 3 to 11 satisfying $(B+C)/A \leq 2$ had further satisfactory result in the evaluation of the feel by hand in fabric, as compared with that in Example 2 in which $(B+C)/A = 2.3$.

On the other hand, each of Comparative Examples 1 to 4 in which $0.9 > (B+C)/A$ and which does not satisfy the above-described condition (1) had an unsatisfactory result in the evaluation of the rubbing resistance in fabric. Further, Comparative Example 5 in which $B=9$ and which does not satisfy the above-described condition (3) had an unsatisfactory result in the evaluation of the maintenance performance of the ink.

Parts or all of the embodiments and Examples described above can be also described as follows. However, the present teaching is not limited to the following description.

According to an aspect of the present teaching, there is provided an ink jet-recording apparatus including:
an ink set accommodating section;
an ink jetting (discharging) mechanism;
a treatment agent applying mechanism; and
a controlling mechanism,
wherein the ink set of the first aspect is accommodated in the ink set accommodating section;
the water-based ink composing the ink set is jetted onto a recording medium by the ink jetting mechanism;
the treatment agent composing the above-described ink set is applicable to the recording medium by the treatment agent applying mechanism; and
the controlling mechanism is configured to control application of the treatment agent by the treatment agent applying mechanism, depending on a kind of the recording medium.

The ink-jet recording apparatus may further include a drying mechanism; and the drying mechanism may dry the recording medium after the treatment agent has been applied to the recording medium.

As described above, the ink set of the present teaching is capable of realizing, for example in the image formation on the fabric, both of the high rubbing resistance and suppressed change in feel by hand, and is capable of realizing the high maintenance performance and the applicability also to image formation on recording paper. The way of use or application of the ink set of the present teaching are not specifically limited, and the ink set of the present teaching is widely applicable to the image formation on a variety of kinds of recording media.

What is claimed is:

1. An ink set usable for forming an image on a recording medium which is fabric or recording paper, the ink set comprising:
a water-based ink for ink-jet recording including a pigment, a first resin and water; and
a treatment agent including a second resin and water,
wherein the second resin included in the treatment agent is a cationic polymer including a urethane structure and one or more of an acrylic structure or a styrene structure, and
the ink set satisfies the following conditions (1) to (4):

$$0.9 \leq (B+C)/A \qquad \text{condition (1)}$$

$$3 \leq A \leq 9 \qquad \text{condition (2)}$$

$$B<9, \quad \text{condition (3)}$$

$$(B+C)/A \leq 2, \quad \text{condition (4)}$$

in the conditions (1) to (4),

A: a blending amount (% by weight) of the pigment in an entire amount of the water-based ink, B: a blending amount (% by weight) of the first resin in the entire amount of the water-based ink, and C: a blending amount (% by weight) of the second resin in an entire amount of the treatment agent.

2. The ink set according to claim 1, wherein an average particle diameter of the pigment is not more than 110 nm.

3. The ink set according to claim 1, wherein the treatment agent includes an emulsion of the cationic polymer having the urethane structure.

4. The ink set according to claim 1, wherein the cationic polymer having the urethane structure includes the acrylic structure.

5. The ink set according to claim 1, wherein the pigment is a self-dispersible pigment.

6. The ink set according to claim 1, wherein the pigment is a resin-dispersed pigment.

7. The ink set according to claim 1, wherein the pigment is a resin-dispersed pigment; and
the first resin includes both of a resin for dispersing pigment and a binder resin.

8. An image forming method for forming an image on a fabric by using the ink set as defined in claim 1, the image forming method comprising:

applying the treatment agent to the fabric in an application amount of the treatment agent per an area of the fabric in a range of 4.7 mg/cm$^2$ to 50 mg/cm$^2$; and jetting the water-based ink onto the fabric by an ink-jet system.

9. An ink jet-recording apparatus comprising:

an ink set accommodating section which accommodates therein the ink set as defined in claim 1;

an ink-jet head configured to jet the water-based ink composing the ink set onto a recording medium; and a treatment agent applying mechanism configured to apply the treatment agent composing the ink set to the recording medium; and a controller configured to control the treatment agent applying mechanism to apply the treatment agent to the recording medium, depending on a kind of the recording medium, and to control the ink-jet head to jet the water-based ink onto the recording medium, wherein a case that the recording medium is the fabric, the controller is configured to control the treatment agent applying mechanism to apply the treatment agent to the fabric in an application amount of the treatment agent per an area of the fabric in a range of 4.7 mg/cm$^2$ to 50 mg/cm$^2$.

* * * * *